(12) United States Patent
Masumoto et al.

(10) Patent No.: US 10,220,691 B2
(45) Date of Patent: Mar. 5, 2019

(54) SEALING STRUCTURE FOR AUTOMOBILE DOOR

(71) Applicants: NISHIKAWA RUBBER CO., LTD., Hiroshima (JP); MAZDA MOTOR CORPORATION, Hiroshima (JP)

(72) Inventors: Atsuo Masumoto, Hiroshima (JP); Masahiro Morioka, Hatsukaichi (JP); Masaki Motodera, Hiroshima (JP); Daisuke Nakazato, Hiroshima (JP); Tatsuya Nagai, Hiroshima (JP); Yusuke Migaki, Hiroshima (JP); Hisatoshi Kinoshita, Hiroshima (JP)

(73) Assignees: NISHIKAWA RUBBER CO., LTD., Hiroshima (JP); MAZDA MOTOR CORPORATION, Hiroshima (JP)

( * ) Notice: Subject to any disclaimer, the term of this patent is extended or adjusted under 35 U.S.C. 154(b) by 87 days.

(21) Appl. No.: 15/422,855

(22) Filed: Feb. 2, 2017

(65) Prior Publication Data
US 2017/0225552 A1    Aug. 10, 2017

(30) Foreign Application Priority Data
Feb. 4, 2016 (JP) ................. 2016-019580

(51) Int. Cl.
*B60J 10/76* (2016.01)
*B60J 10/75* (2016.01)
(Continued)

(52) U.S. Cl.
CPC ............. *B60J 10/76* (2016.02); *B60J 5/0411* (2013.01); *B60J 10/22* (2016.02); *B60J 10/233* (2016.02); *B60J 10/277* (2016.02); *B60J 10/45* (2016.02); *B60J 10/75* (2016.02); *E06B 7/2305* (2013.01); *E06B 7/2314* (2013.01)

(58) Field of Classification Search
CPC . B60J 10/277; B60J 10/76; B60J 10/75; B60J 5/0411
See application file for complete search history.

(56) References Cited

U.S. PATENT DOCUMENTS 7,407,205 B2 * 8/2008 Nakao ..................... B60R 13/04
   293/128
9,038,318 B2 * 5/2015 Jendrossek ............ B60J 10/041
   49/377

(Continued)

FOREIGN PATENT DOCUMENTS

EP    2063057 A1 * 5/2009 ............ B60J 5/0411
JP    3710030 B2    8/2005
(Continued)

*Primary Examiner* — Marcus Menezes
(74) *Attorney, Agent, or Firm* — Renner Otto Boisselle & Sklar, LLP

(57) ABSTRACT

It is an object of the present disclosure to improve installation workability by reducing the risk of installation failures of a belt line sealing member in the case where a vertical glass run and a sealing member are installed separately to a door panel.
A belt line sealing member 20 includes a panel insertion groove 24 opening downward. The belt line sealing member 20 includes an end portion provided with a stopper portion 51 reducing the risk of rim portions 111a and 111b of a notch 111 of an inner peripheral flange 109 entering the panel insertion groove 24.

5 Claims, 13 Drawing Sheets

(51) Int. Cl.
*B60J 10/22* (2016.01)
*B60J 10/23* (2016.01)
*B60J 10/277* (2016.01)
*B60J 10/00* (2016.01)
*B60J 5/04* (2006.01)
*E06B 7/23* (2006.01)

(56) References Cited

U.S. PATENT DOCUMENTS

| | | | | |
|---|---|---|---|---|
| 2001/0025451 | A1* | 10/2001 | Nozaki | B60J 10/18 49/341 |
| 2009/0151266 | A1* | 6/2009 | Shumulinskiy | B60J 10/365 49/489.1 |
| 2010/0313487 | A1* | 12/2010 | Ellis | B60J 10/265 49/502 |
| 2017/0057334 | A1* | 3/2017 | Toyota | B60J 5/0418 |
| 2017/0225553 | A1* | 8/2017 | Masumoto | B60J 10/76 |
| 2017/0274748 | A1* | 9/2017 | Masumoto | B60J 10/18 |
| 2018/0050582 | A1* | 2/2018 | Walawender | B60J 10/76 |
| 2018/0170285 | A1* | 6/2018 | Itoh | B60R 13/06 |

FOREIGN PATENT DOCUMENTS

| | | | | |
|---|---|---|---|---|
| JP | 3746866 B | | 12/2005 | |
| WO | WO-2015079878 A1 | * | 6/2015 | ............ B60J 5/0418 |
| WO | WO-2017141892 A1 | * | 8/2017 | ............. B60R 13/04 |

\* cited by examiner

INSIDE OF AUTOMOBILE COMPARTMENT ← → OUTSIDE OF AUTOMOBILE COMPARTMENT

FRONT ← A    B → REAR

INSIDE OF
AUTOMOBILE ←
COMPARTMENT

OUTSIDE OF
→ AUTOMOBILE
COMPARTMENT

SEALING STRUCTURE FOR AUTOMOBILE DOOR

CROSS-REFERENCE TO RELATED APPLICATION

This application claims priority to Japanese Patent Application No. 2016-019580 filed on Feb. 4, 2016, the entire disclosure of which is incorporated by reference herein.

BACKGROUND

The present disclosure relates to a sealing structure provided in an automobile door made by press forming, and particularly relates to the field of glass runs and seal structures for belt lines.

For example, Japanese Patent No. 3710030 discloses a so-called press forming door including a window frame and a door body portion both made by press forming. The window frame is for supporting a window glass. The window frame is provided with a glass run including a sealing member, which is in contact with a circumferential portion of the window glass. Further, Japanese Patent No. 3746866 discloses a belt line of a door provided with a sealing member distinct from a glass run. This sealing member is provided in the longitudinal direction of an automobile along the belt line, whereas the glass run is provided vertically along the front rim portion and the rear rim portion of the window glass.

For example, some door panels include a window frame having a cross section the shape of which inflates in transverse direction of the automobile such that the cross-sectional area increases resulting in an increased strength. Such a cross-sectional shape leads to difficulties in drawing during the press forming process. If the window frame has a shape difficult to draw, wrinkling etc. is likely to occur particularly on corners of a flange provided on an inner peripheral side of the window frame. For this reason, in some cases, for example a notch having a shape similar to that in FIG. 3 of Japanese Patent No. 3710030 is provided in a corner of an inner peripheral flange of a window frame. However, this notch might be larger than that disclosed in Japanese Patent No. 3710030.

A large notch provided in the corner of the inner peripheral flange of the window frame might cause problems during installation of a sealing member to a belt line as described below. As disclosed in Japanese Patent No. 3746866, a vertical glass run and a horizontal sealing member of a belt line may be provided as separate members. In this case, for installing the glass run to the door frame, the glass run may have a split structure, i.e., may include a lower portion that sandwiches the door panel laterally in order to enable the glass run to be positioned correctly relative to the door panel. Moreover, a covering plate reaching the region below the level of the belt line of the inner peripheral flange may be provided.

The sealing member of the belt line has a U-shaped cross section into which the inner peripheral flange of the window frame is inserted, and this inner peripheral flange includes a corner provided with the above-described notch. Therefore, during the installation of the sealing member of the belt line after the installation of the glass run, an operator might end up pressing an end portion of the sealing member of the belt line further into the notch of the inner peripheral flange than required. As a result, the end portion of the sealing member of the belt line might end up being displaced below the split portion of the glass run. Then, the end portion of the sealing member ends up penetrating the split portion of the glass run when the sealing member inclined downward is installed substantially parallel to the belt line of the inner peripheral flange. That is, there is a risk of improper installation.

In short, the installation workability of the sealing member of the belt line deteriorates if, in consideration of formability during pressing, the corner of the inner peripheral flange of the door frame is provided with a large notch, and the sealing member of the belt line, which is separate from the glass run, is installed after the glass run has been installed.

In view of the foregoing, it is an object of the present disclosure to provide improved installation workability by reducing the risk of installation failures of the sealing member of the belt line in the case where the vertical glass run and the sealing member provided on the belt line are installed separately to the door panel.

SUMMARY

A first aspect of the present disclosure is directed to
a sealing structure for an automobile door,
the automobile door being a door panel comprised of a press-formed article and including a window frame supporting a window glass,
the window frame having an inner peripheral side on which an inner peripheral flange is located, and
the inner peripheral flange including a belt line including a corner provided with a notch;
the sealing structure comprising:
a glass run vertically extending on a vertically extending portion of the inner peripheral flange, and
a belt line sealing member provided on the belt line of the inner peripheral flange and extending in a longitudinal direction of an automobile,
wherein
the belt line sealing member includes a longitudinal end,
the longitudinal end is in contact with the glass run,
the glass run includes a covering plate covering the inner peripheral flange,
the covering plate includes a region corresponding to the belt line,
the region includes a lower end portion located at least near a rim portion of the notch of the inner peripheral flange,
the belt line sealing member is provided with a panel insertion groove into which the belt line of the inner peripheral flange is inserted,
the panel insertion groove opens downward,
the belt line sealing member includes an end portion near the glass run, and
the end portion near the glass run is provided with a stopper portion, which reduces risk of the rim portion of the notch of the inner peripheral flange entering the panel insertion groove.

As described above, the inner peripheral flange includes the belt line including the corner provided with the notch. This reduces occurrence of wrinkling etc. when a difficult press forming process is employed to increase the cross section shape of the window frame. That is, the design of the cross section shapes of the window frame and the vicinity thereof may be chosen more flexibly.

In a state where the glass run is installed on the door panel, the lower end portion of the covering plate of the glass run is located near the rim portion of the notch of the inner peripheral flange. Thus, the glass run is positioned correctly relative to the door panel. Afterward, during installation of the belt line sealing member to the door panel, the belt line of the inner peripheral flange is inserted into the panel insertion groove. At this time, the end portion of the belt line sealing member is provided with the stopper portion, which reduces the risk of the rim portion of the notch the inner peripheral flange entering the panel insertion groove. This reduces the risk of the end portion of the belt line sealing member being displaced more downward than necessary, i.e., the risk of the end portion entering the glass run. This results in an improved installation workability.

According to a second aspect of the present disclosure related to the first aspect of the present disclosure, the belt line sealing member includes an inside wall and an outside wall, each provided vertically, the inside wall and the outside wall sandwich the belt line of the inner peripheral flange in a transverse direction of the automobile, and the stopper portion bridges the inside wall and the outside wall of the belt line sealing member, and the inside wall and the outside wall are coupled by the stopper portion.

According to this configuration, the inside wall and the outside wall of the belt line sealing member are coupled by the stopper portion. This reduces the risk of deformation of the inside wall, the outside wall, and the stopper portion as a whole. That is, the stopper portion provides further advantages.

According to a third aspect of the present disclosure related to the second aspect of the present disclosure, the belt line sealing member includes an upper wall continuous with an upper portion of the inside wall and an upper portion of the outside wall, and the stopper portion is integrated with the upper wall.

According to this configuration, the stopper portion is integrated with the upper wall of the belt line sealing member. This reduces the risk of deformation of the stopper portion. That is, the stopper portion provides further advantages.

According to a fourth aspect of the present disclosure related to the first aspect of the present disclosure, the notch of the inner peripheral flange includes an inclined rim portion, and the stopper portion includes a lower end surface inclined in the same direction as the rim portion of the notch.

According to this configuration, it is easy to move the lower end surface of the stopper portion along the rim portion of the notch of the door panel when installing the belt line sealing member.

According to a fifth aspect of the present disclosure related to the first aspect of the present disclosure, the belt line sealing member includes a seal portion made of an elastic material and in contact with the window glass, and a core member made of a rigid material harder than the elastic material used for the seal portion, and the core member is not longitudinally extendable.

According to this configuration, the belt line sealing member includes the core member, which is not extendable and improves the rigidity of the belt line sealing member. This reduces the risk of deformation of the belt line sealing member when the belt line sealing member is installed, thus resulting in an improved installation workability.

According to the first aspect of the present disclosure, the end portion of the belt line sealing member is provided with the stopper portion, which reduces the risk of the rim portion of the notch formed in the corner of the inner peripheral flange of the door frame entering the sealing member. This can reduce the risk of installation failures of the sealing member of the belt line in the case where the glass run and the belt line sealing member are installed separately to the door panel, and thus improve installation workability.

According to the second aspect of the present disclosure, the inside wall and the outside wall of the belt line sealing member are coupled by the stopper portion. This can reduce the risk of deformation of the inside wall, the outside wall, and the stopper portion as a whole. That is, the stopper portion can provide further advantages.

According to the third aspect of the present disclosure, the stopper portion is integrated with the upper wall of the belt line sealing member. This can reduce the risk of deformation of the stopper portion. That is, the stopper portion can provide further advantages.

According to the fourth aspect the present disclosure, the lower end surface of the stopper portion is inclined. Thus, it is easy to move the lower end surface of the stopper portion along the rim portion of the notch of the door panel when installing the belt line sealing member. This can improve installation workability.

According to the fifth aspect of the present disclosure, the belt line sealing member includes the seal portion made of an elastic material and the core member made of a rigid material and not being extendable. This can improve installation workability.

DETAILED DESCRIPTION

An embodiment of the present disclosure will be described below in detail with reference to the drawings. The following beneficial embodiment is merely illustrative in nature, and is not intended to limit the present disclosure, applications of the present disclosure, or use of the present disclosure.

Figure 1:
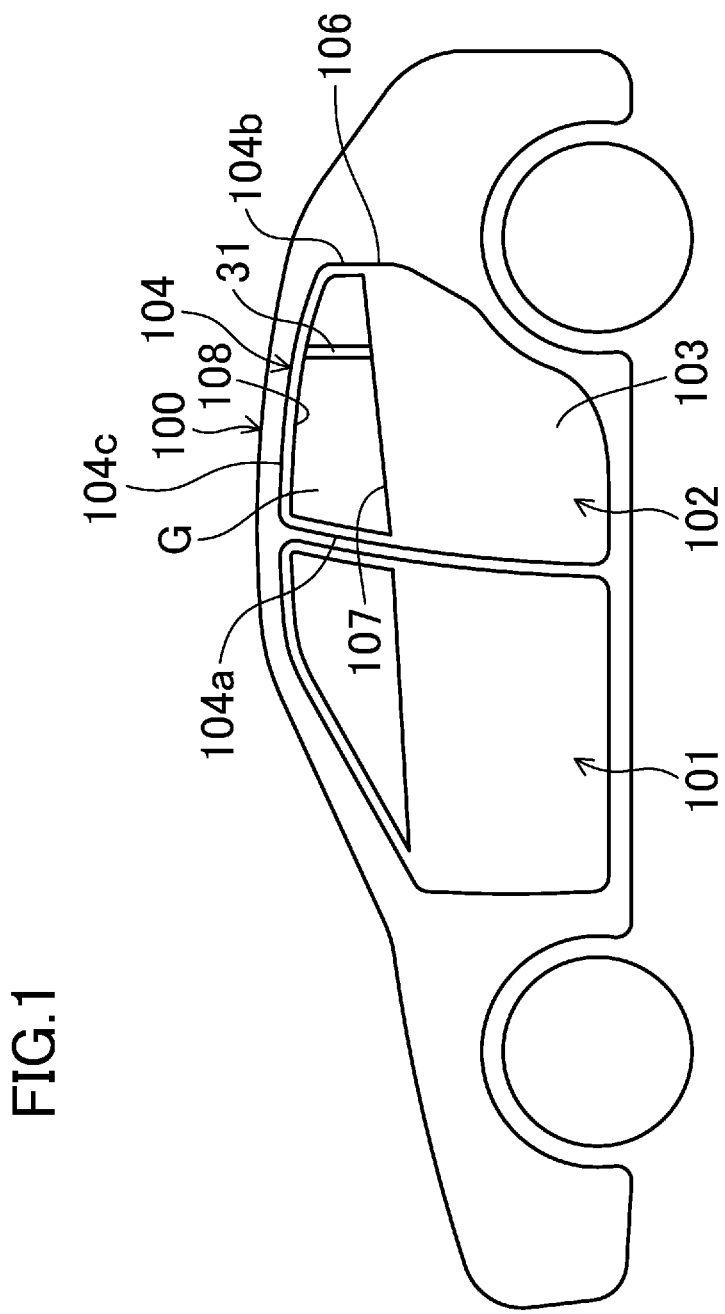
FIG. 1 is a left side view of an automobile including an automobile door of an embodiment.

FIG. 1 is a left side view of an automobile 100 of the embodiment of the present disclosure. This automobile 100 has right and left sides, each of which is provided with a front door 101 and a rear door 102. The front door 101 and the rear door 102 are automobile doors of the present disclosure, and each includes a front end portion pivotally attached to an automobile body through a hinge (not shown). This embodiment is an application of the present disclosure to the rear door 102, but the present disclosure can as well be applied to the front door 101. The present disclosure can also be applied to the doors 101 and 102 on either side. In the explanation of this embodiment, the front side of the automobile is simply referred to as "front," and the rear side of the automobile is simply referred to as "rear."

(Rear Door Configuration)

The rear door 102 includes a door body 103, namely a generally lower half portion of the rear door 102, and a window frame 104, namely a generally upper half portion. This rear door 102 is provided with a window glass G which can be raised and lowered. The door body 103 includes a front end portion attached to the automobile body through the hinge. The door body 103 accommodates a window regulator (not shown) for raising and lowering the window glass G. When lowered, the window glass G is in an open state and is accommodated in the door body 103. The rear door 102 includes an inner panel (door panel) 105 (FIGS. 2-7 illustrate the inner panel on the right side of the automobile) and an outer panel (door panel) 106 (FIG. 1 illustrates the outer panel on the left side of the automobile). The inner panel 105 faces the inside of the automobile compartment and is a press-formed article. The outer panel 106 faces the outside of the automobile compartment and is a press-formed article. The inner panel 105 and the outer panel 106 are made of, e.g., a steel sheet, and have a symmetrical shape.

As illustrated in FIG. 1, the window frame 104 has a frame shape supporting a circumferential portion of the window glass G, and forms an opening 108 for the window glass. The window frame 104 includes a front vertical frame bar 104a, a rear vertical frame bar 104b, and an upper frame bar 104c. The front vertical frame bar 104a extends vertically in a front part of the rear door 102, and has a cross section opening toward the rear side. The rear vertical frame bar 104b extends vertically in the rear part of the rear door 102, and has cross section opening toward the front side. The front vertical frame bar 104a and the rear vertical frame bar 104b each include a lower portion, which reaches the inside of the door body 103 so as to guide the window glass G into the door body 103 when the same is lowered. The upper frame bar 104c extends from an upper end portion of the front vertical frame bar 104a to an upper end portion of the rear vertical frame bar 104b, and opens toward the lower side. The upper frame bar 104c is also included downward toward the rear side in accordance with the shape of the window glass G.

Figure 2:
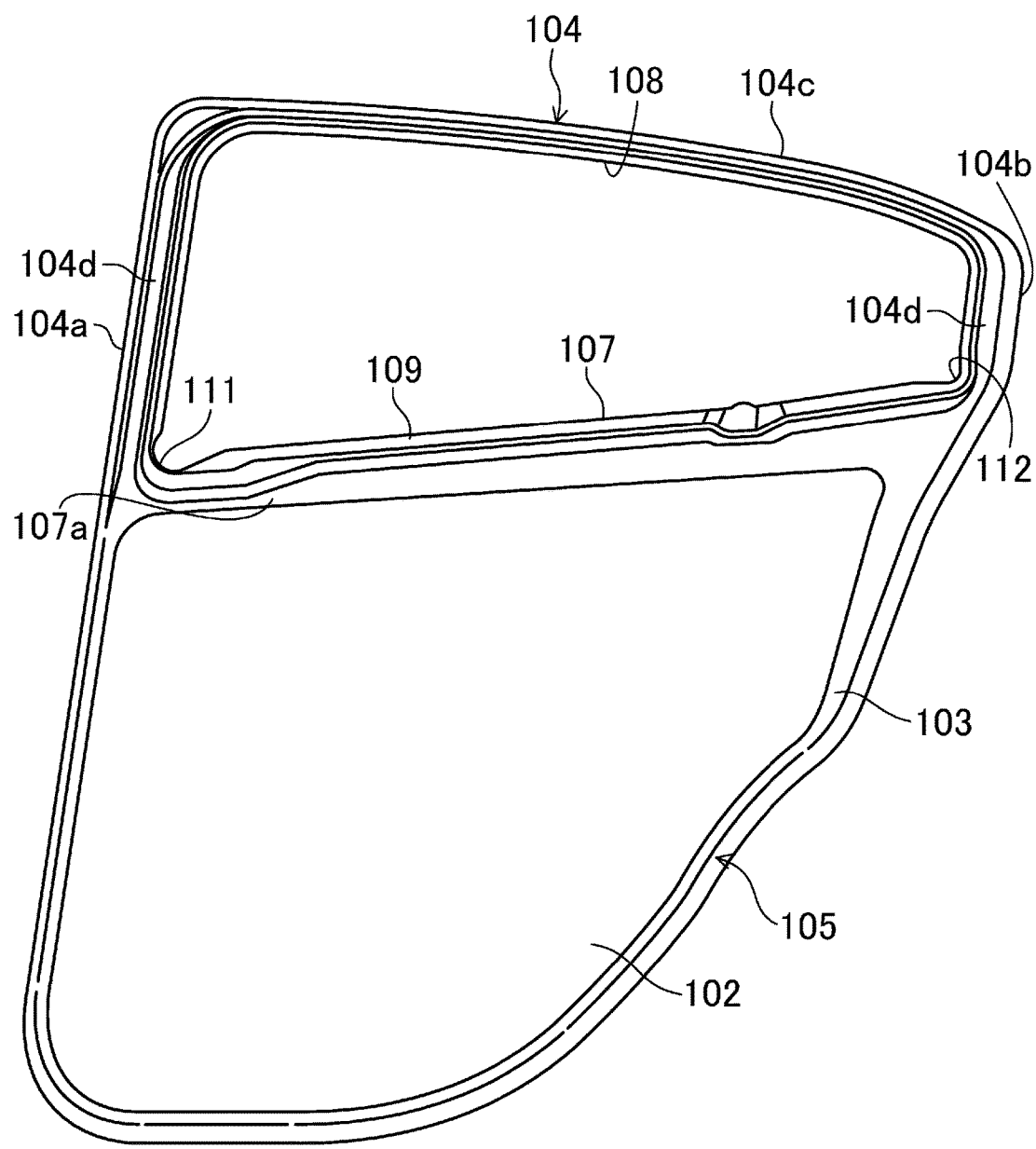
FIG. 2 is a side view of a right side rear door inner panel viewed from inside an automobile compartment.

The rear door 102 includes a belt line 107 extending along a lower rim portion of the opening 108 for the window glass. In this embodiment, the belt line 107 is inclined upward toward the rear side, i.e., inclined downward toward the front side. This is required in terms of automobile design, and alternatively the belt line 107 may be generally horizontal. As illustrated in FIG. 2, an inner peripheral flange 109 is provided almost all the way along the circumferential portion of the opening 108 for the window glass of the inner panel 105, i.e., almost all the way along an inner periphery of the window frame 104. This inner peripheral flange 109 includes a lower portion extending longitudinally.

As illustrated in FIG. 2, the inner panel 105 includes a portion serving as the window frame 104 and a portion serving as the door body 103 both of which are integrated by press forming. This inner panel 105 has a portion including the upper half portion, namely the window frame 104. This portion is provided with a frame inflating portion 104d inflating toward the inside of the automobile compartment. The inner panel 105 has a portion including the belt line 107. Below this portion, a belt line inflating portion 107a inflating toward the inside of the automobile compartment is formed. The belt line inflating portion 107a extends longitudinally. A front portion of the belt line inflating portion 107a is continuous with a front portion of the frame inflating portion 104d, and a rear portion of the belt line inflating portion 107a is continuous with a rear portion of the frame inflating portion 104d. This allows a cross section of a circumferential portion of the window frame 104 to expand in the transverse direction of the automobile compartment, which increases the strength of the window frame 104.

Front and rear corners of the belt line 107 are located below the inner peripheral flange 109. The front corner is provided with a front notch 111, and the rear corner is provided with a rear side notch 112. The front notch 111 and the rear side notch 112 are provided for the following reason. The frame inflating portion 104d and the belt line inflating portion 107a strongly inflating during their formation, makes the window frame 104 and its surroundings difficult to draw. Then, during the press forming process, wrinkling etc. is likely to occur on corners, such as the two corners below the inner peripheral flange 109, which have a moderate curvature. This problem increases the risk of forming failures. Here, providing the front notch 111 and the rear side notch 112 on the inner peripheral flange 109 allows for performing the press forming process without the portions where wrinkling etc. is likely to occur. This reduces the risk of forming failures. In this embodiment, the risk of forming failures may be reduced even if the front notch 111 and the rear side notch 112 are large and thus difficult to draw.

Figure 3:
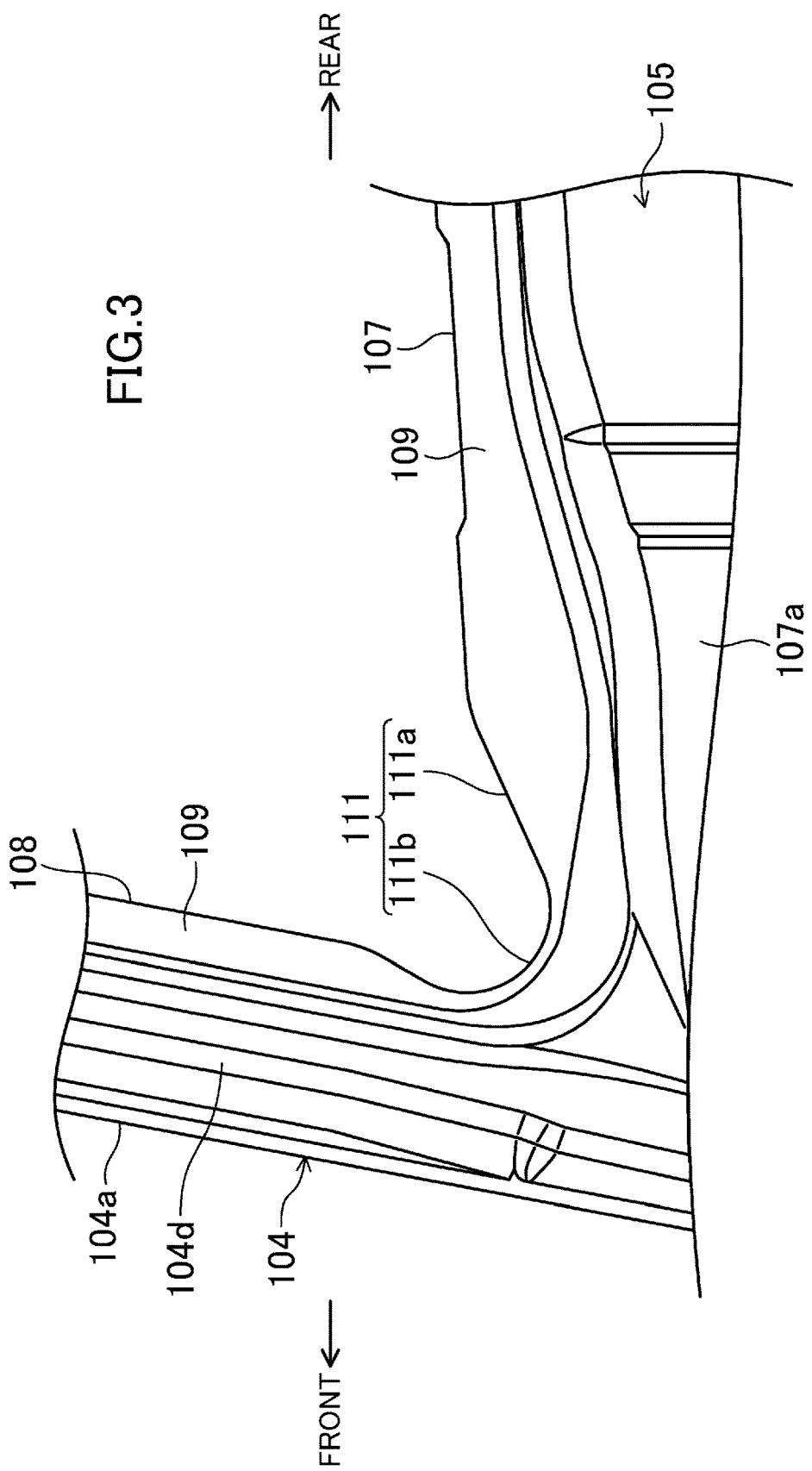
FIG. 3 is an enlarged view of the front side of a belt line of the right side rear door inner panel.
Figure 4:
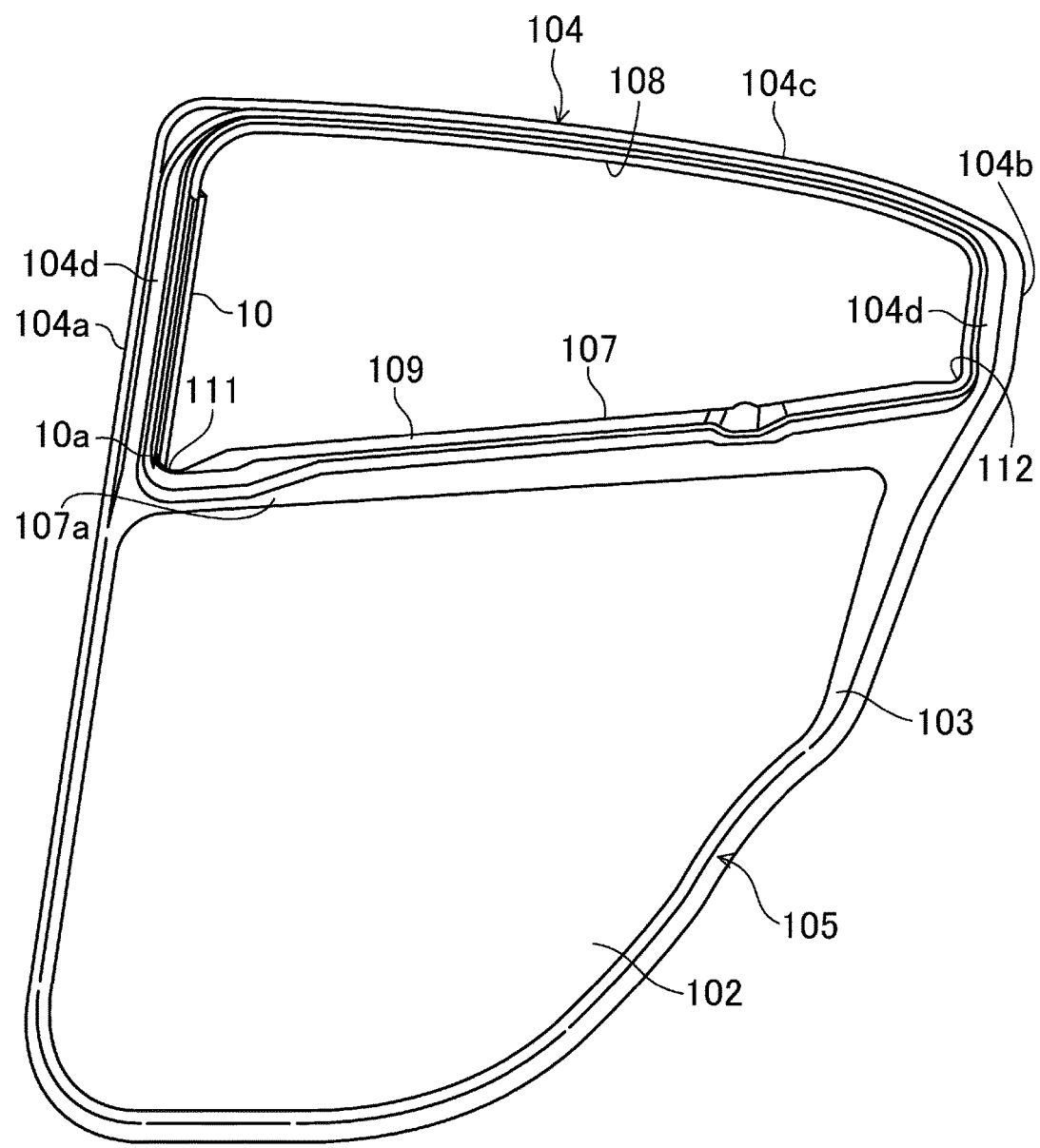
FIG. 4 corresponds to FIG. 2 except for a front glass run being installed.

As illustrated in FIG. 3, the front notch 111 includes a rear side rim portion 111a inclined downward toward the front side. A front rim portion 111b is continuous with a front portion of the rear side rim portion 111a and substantially arc-shaped.

Figure 5:
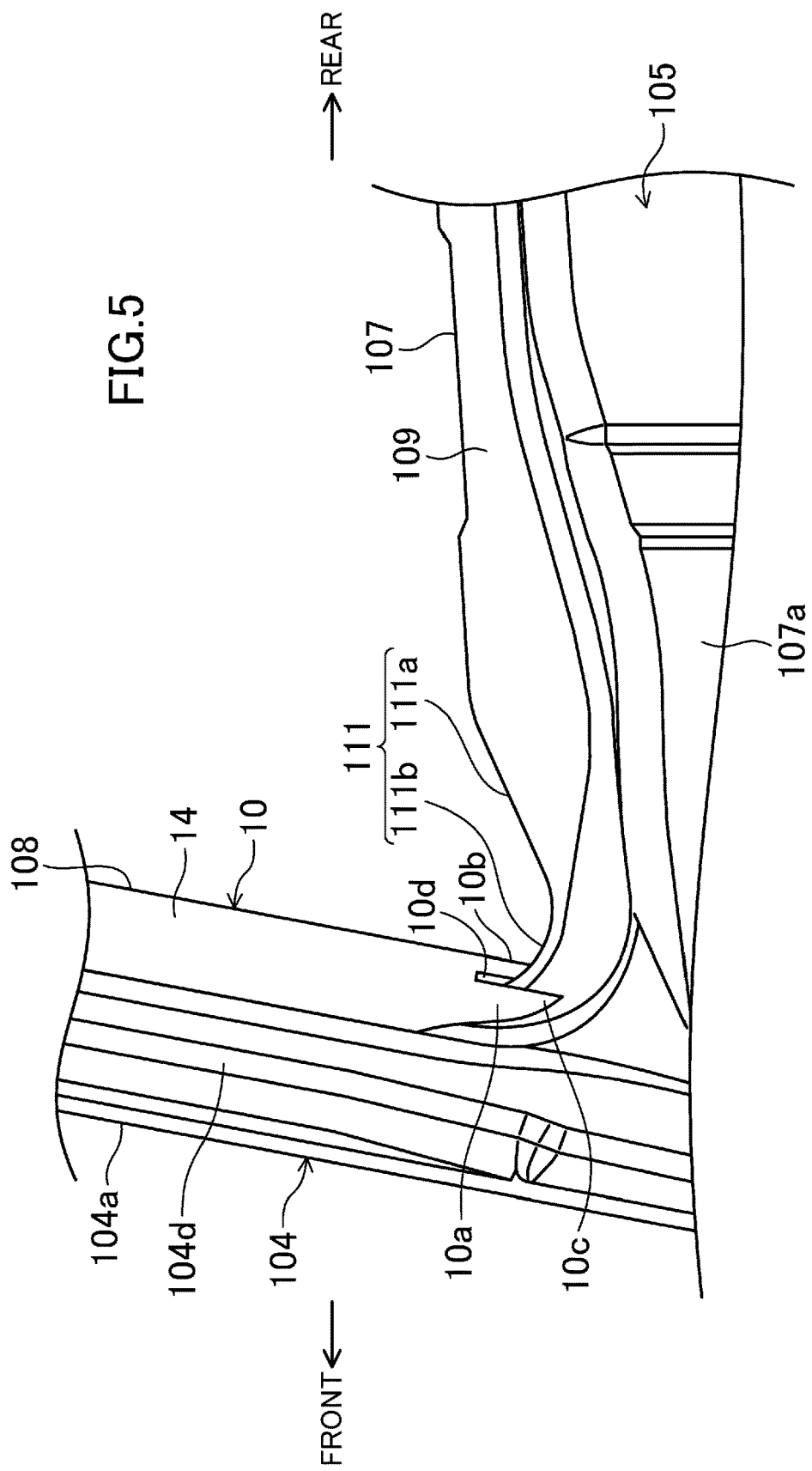
FIG. 5 corresponds to FIG. 3 except for the front glass run being installed.
Figure 6:
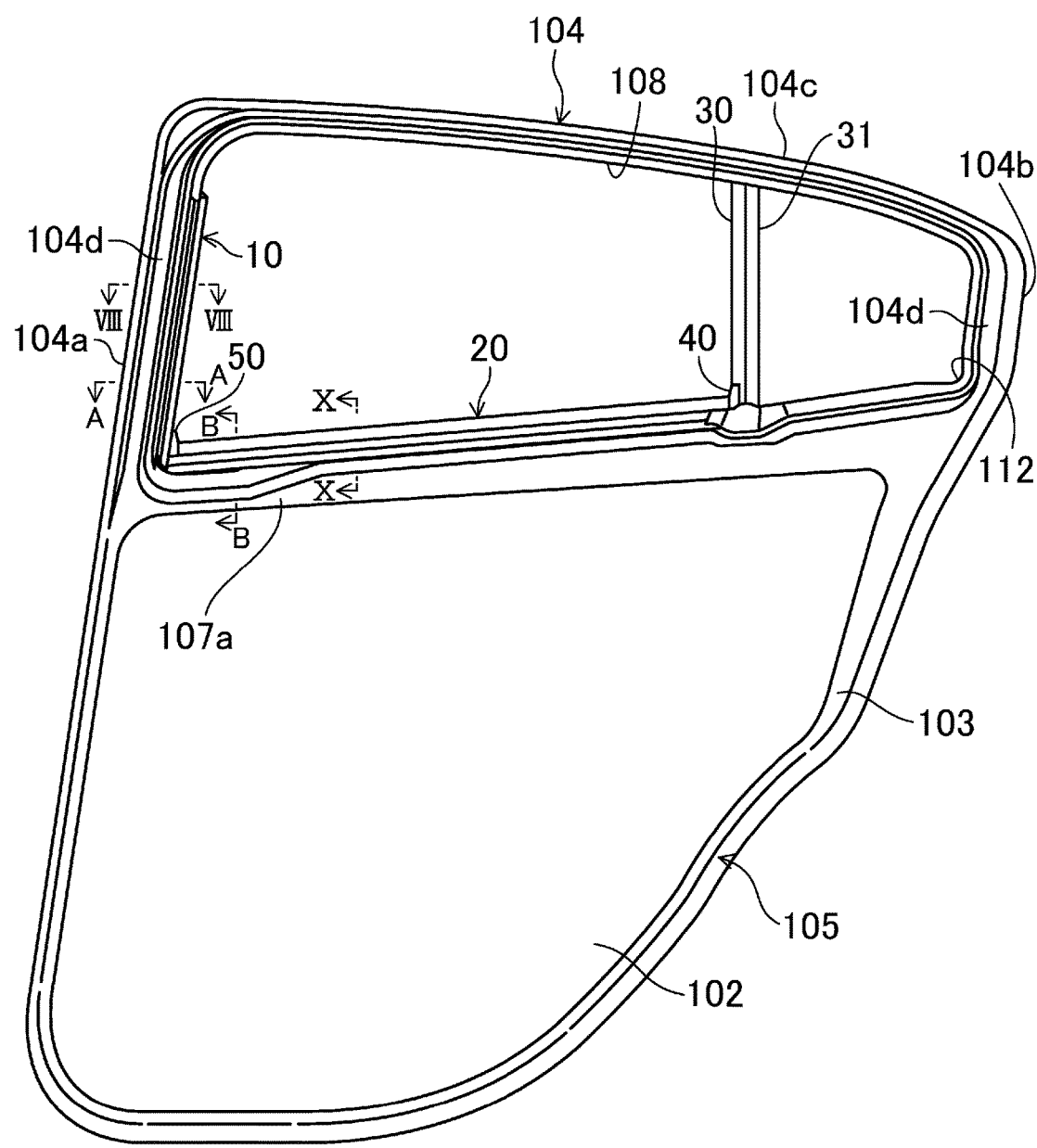
FIG. 6 corresponds to FIG. 2 except for the front glass run, a rear glass run, and a belt line sealing member being installed.
Figure 7:
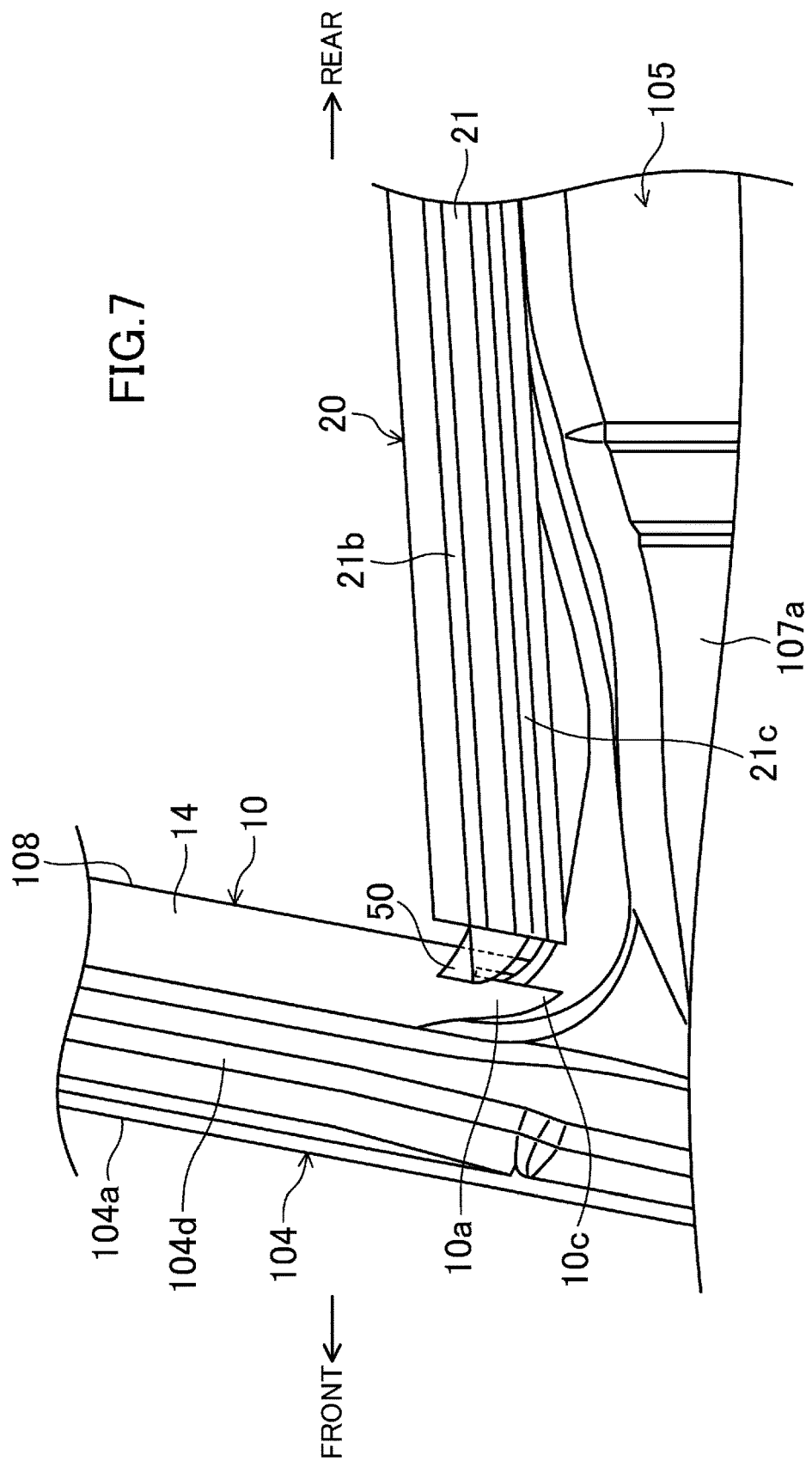
FIG. 7 corresponds to FIG. 3 except for the front glass run and the belt line sealing member being installed.

As illustrated in FIGS. 4-7, a front glass run 10 is provided vertically on and along a vertical front portion of the inner peripheral flange 109. As illustrated in FIG. 6, a rear glass run 30 is provided vertically at a predetermined distance rearward from the front glass run 10. As illustrated in FIGS. 6 and 7, a belt line sealing member 20 is provided longitudinally on the belt line 107 of the inner peripheral flange 109.

Figure 10:
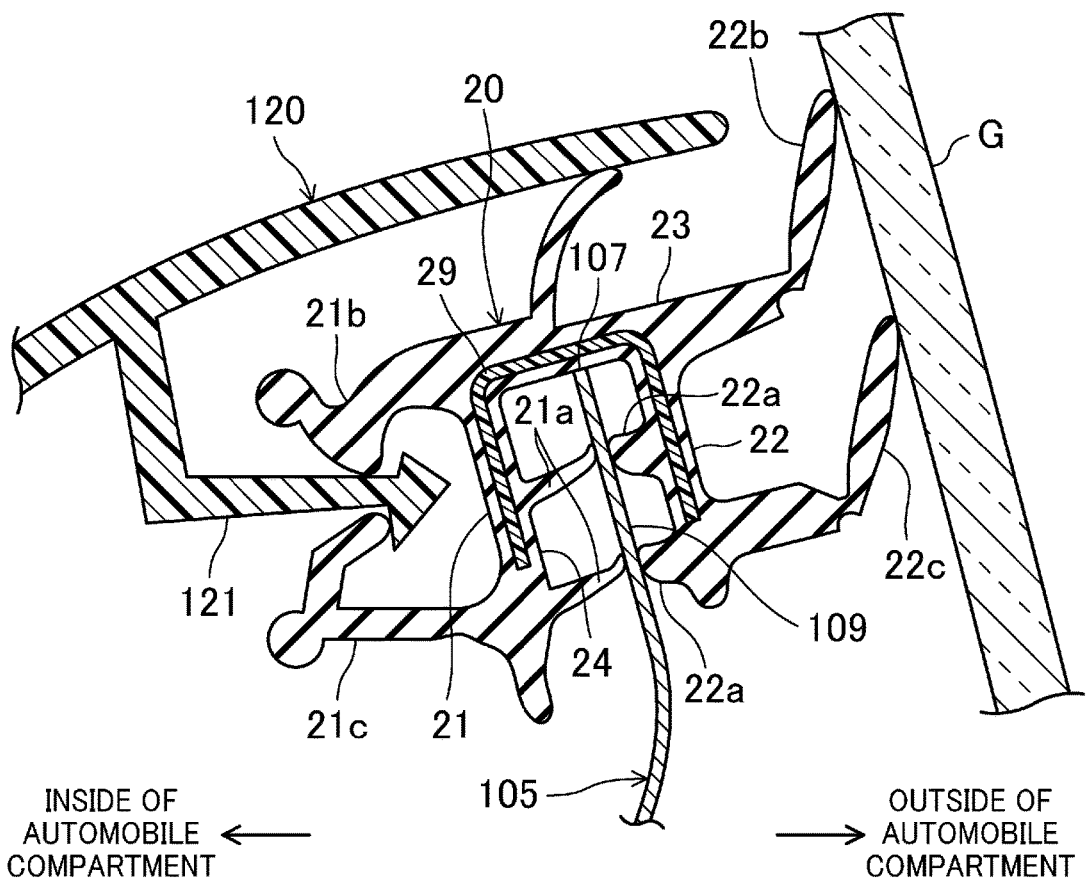
FIG. 10 is a cross sectional view taken along line X-X in FIG. 6.

As illustrated in FIG. 10, a door trim 120 can be attached to the inner panel 105 from the inside of the automobile compartment. The door trim 120 includes an upper portion having an outer surface facing the outside of the automobile compartment. An attaching portion 121 protruding toward the outside of the automobile compartment is provided on this outer surface.

(Glass Run Configuration)

Next, the front glass run 10 will be described. The front glass run 10 is provided to seal a gap between a front rim portion of the window glass G and the front vertical frame bar 104a of the window frame 104, and is made of an elastic material. This elastic material is, for example, a thermoplastic elastomer such as a thermoplastic styrene elastomer (TPS) or a thermoplastic olefin elastomer (TPO), or rubber such as ethylene propylene diene monomer (EPDM) rubber.

Figure 8:
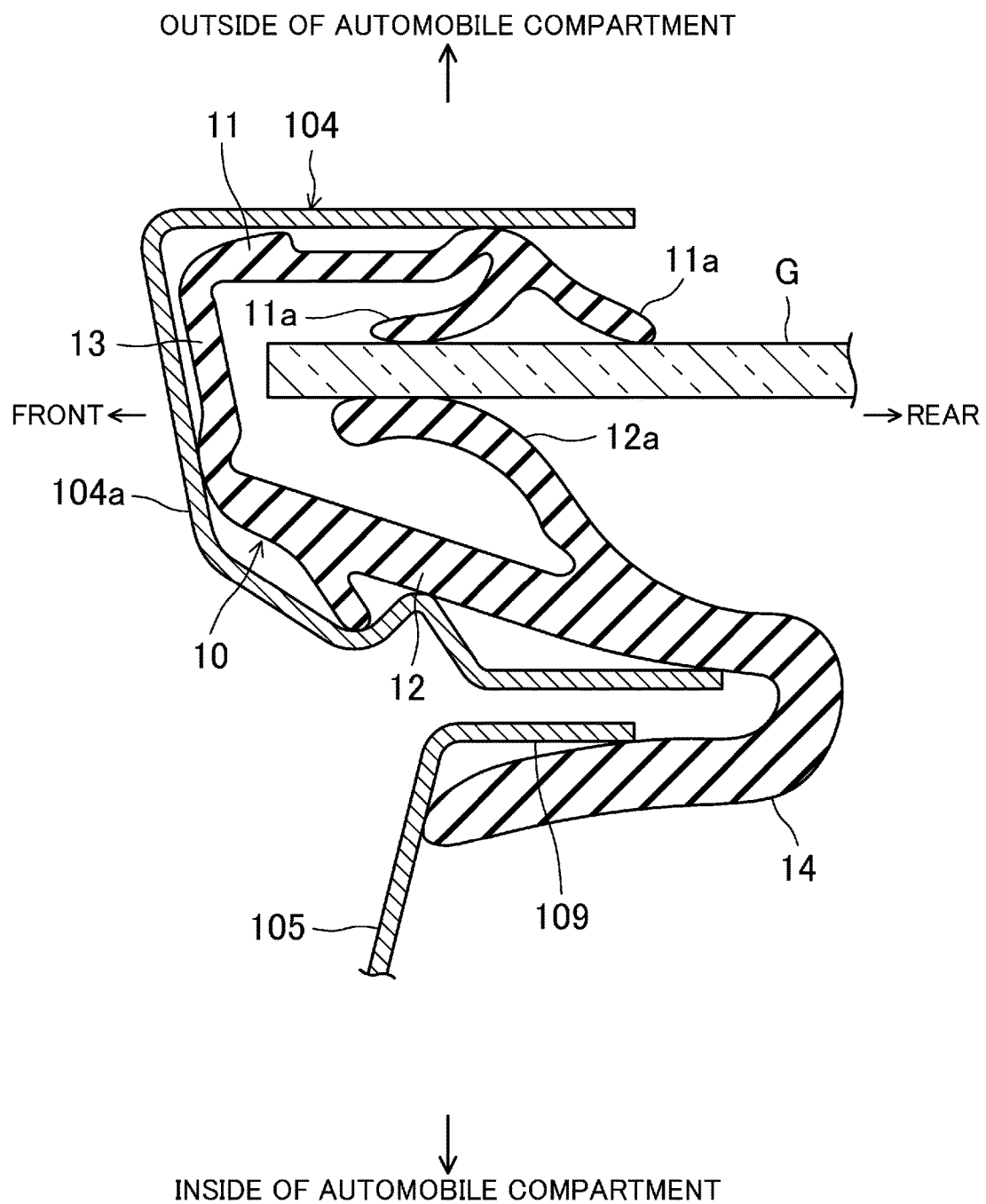
FIG. 8 is a cross sectional view taken along line VIII-VIII in FIG. 6.

As illustrated in FIG. 8, the front glass run 10 includes an outside wall 11, an inside wall 12, and a coupling wall 13. Inside the front vertical frame bar 104a, the outside wall 11 faces the outside of the automobile compartment. The inside wall 12 faces the inside of the automobile compartment. The coupling wall 13 couples the outside wall 11 and the inside wall 12. The outside wall 11 and the inside wall 12 extend along an inner surface of the front vertical frame bar 104a. The outside wall 11 includes a tip end portion, i.e., a rear end portion, provided with a pair of outer seal lips 11a and 11a in sliding contact with an outer surface of the window glass G facing the outside of the automobile compartment. The inside wall 12 includes an outer surface facing the outside of the automobile compartment. This outer surface is provided with an inner seal lip 12a in sliding contact with an inner surface of the window glass G facing the inside of the automobile compartment. The inside wall 12 includes a tip end portion, i.e., a rear end portion, provided with a covering plate 14. The covering plate 14 is bent to cover the inner peripheral flange 109 and extends frontward. The front glass run 10 includes a region including the covering plate 14. The horizontal cross section of this portion opens toward the front side, and is substantially U-shaped.

As illustrated in FIG. 5, the front glass run 10 includes a region which splits in the transverse direction of the automobile in accordance with the belt line 107 such that the front glass run 10 sandwiches the front rim portion 111b of the front notch 111 of the inner peripheral flange 109. In other words, an inside part 10a of the split portion of the front glass run 10 is positioned closer to the inside of the automobile compartment with respect to the inner peripheral flange 109, and an outside portion 10b of the split portion of the front glass run 10 is positioned closer to the outside of the automobile compartment with respect to the inner peripheral flange 109. Thus, the front glass run 10 can also seal a portion below the front rim portion 111b of the front notch 111. Further, the front glass run 10 can be reliably positioned on the inner peripheral flange 109.

In this embodiment, the inside part 10a of the front glass run 10 is shorter than the outside portion 10b, and specifically reaches an upper portion of the belt line inflating portion 107a. The inside part 10a of the front glass run 10 also includes a lower rim portion 10c which is inclined upward toward the front side. The shape of the lower rim portion of the inside part 10a of the front glass run 10 may be substantially horizontal and is not limited to the inclined shape. As the front glass run 10 splits into the inside part 10a and the outside portion 10b, the front glass run 10 may include a slit 10d (illustrated in FIG. 5).

The cross sectional shape of the rear glass run 30 differs from that of the front glass run 10 in that it opens toward the front side, but is basically the same as that of the front glass run 10. The rear glass run 30 is also installed on a support member 31 extending vertically as illustrated in FIG. 6.

(Belt Line Sealing Member Configuration)

Figure 9:
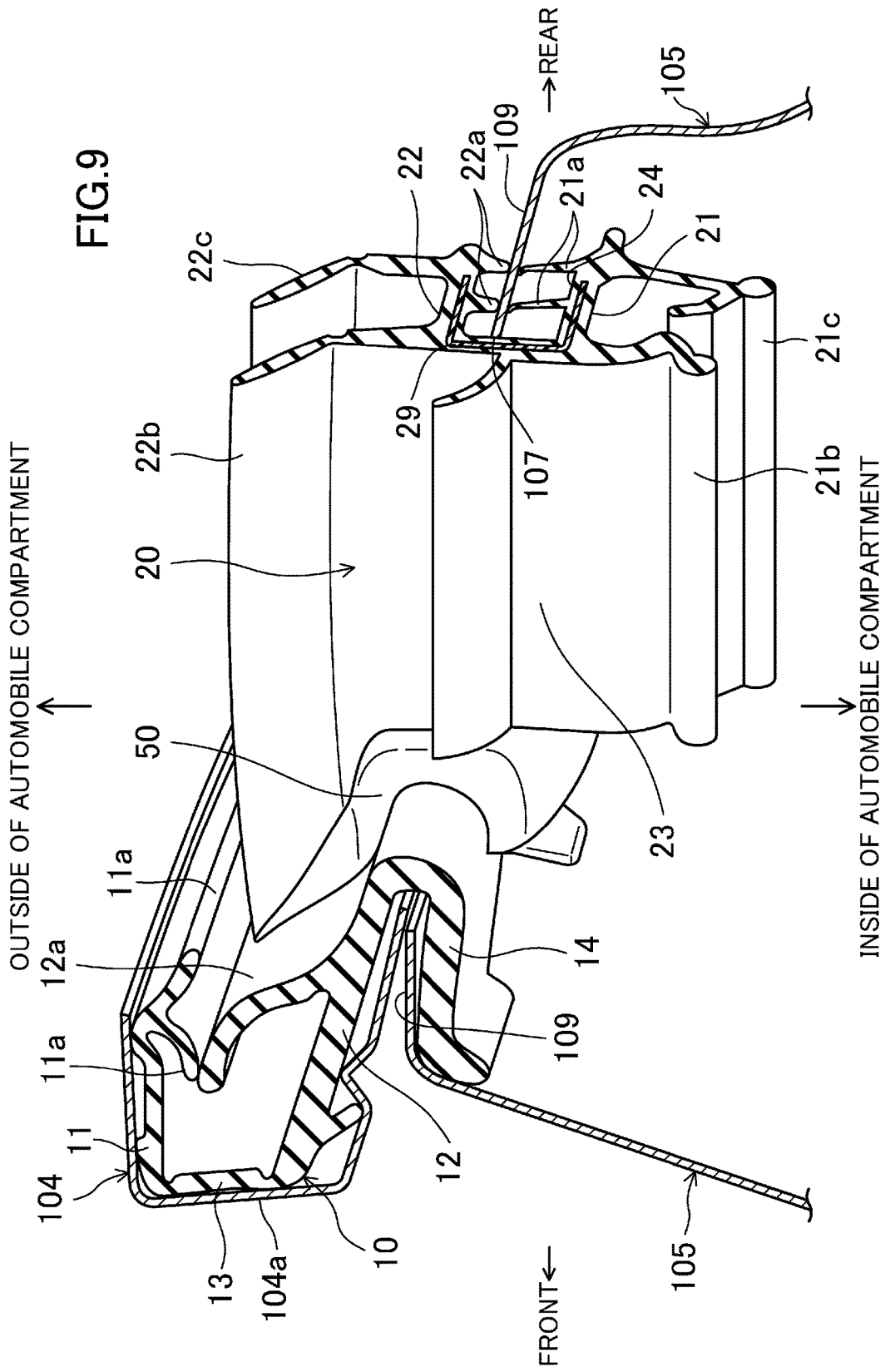
FIG. 9 illustrates a cross section taken along lines A-A and B-B in FIG. 6.

Next, the belt line sealing member 20 will be described. As illustrated in FIG. 6, the belt line sealing member 20 is disposed along the belt line inflating portion 107a extending between the front glass run 10 and the rear glass run 30, and specifically is inclined upward toward the rear side. As illustrated in FIGS. 9 and 10, the belt line sealing member 20 includes an inside wall 21, an outside wall 22, and an upper wall 23. The inside wall 21 is located closer to the inside of the automobile compartment with respect to the inner peripheral flange 109. The outside wall 22 is located closer to the outside of the automobile compartment with respect to the inner peripheral flange 109. Both the inside wall 21 and the outside wall 22 extend vertically. The lower end portion of the inside wall 21 is located below that of the outside wall 22. The upper wall 23 is continuous with the upper portions of the inside wall 21 and the outside wall 22.

The gap between the lower portion of the inside wall 21 and the lower portion of the outside wall 22 opens downward. Accordingly, the belt line sealing member 20 includes a panel insertion groove 24 opening downward into which the inner peripheral flange 109 is inserted. This panel insertion groove 24 is formed in the longitudinal direction between the front end and the rear end of the belt line sealing member 20. The inner peripheral flange 109 is gently inclined upward toward the inside of the automobile compartment.

The inside wall 21 includes an outer surface facing the outside of the automobile compartment. This outer surface is provided with a pair of inside stopping lips 21a and 21a extending longitudinally and spaced vertically. The outside wall 22 includes an inner surface facing the inside of the automobile compartment. This inner surface is provided with a pair of outside stopping lips 22a and 22a extending longitudinally and spaced vertically. The inner peripheral flange 109 inserted into the gap between the inside wall 21 and the outside wall 22, i.e., into the panel insertion groove 24, is elastically linked to and stopped by the inside stopping lips 21a and 21a and the outside stopping lips 22a and 22a.

The inside wall 21 includes an inner surface facing the inside of the automobile compartment. This inner surface is provided with an upper engaging portion 21b and a lower engaging portion 21c, which engage with the attaching portion 121, provided on an upper portion of the door trim 120. The attaching portion 121 of the door trim 120 is sandwiched vertically by the upper engaging portion 21b and the lower engaging portion 21c.

The outside wall 22 includes an outer surface facing toward the outside of the automobile compartment. This outer surface is provided with an upper seal lip 22b and a lower seal lip 22c protruding toward the outside of the automobile compartment. The upper seal lip 22b and the lower seal lip 22c are the seal portions of the present disclosure, and are made of the same elastic material as the glass run 10. The protruding ends of the upper seal lip 22b and the lower seal lip 22c are in contact with the inner surface of the window glass G facing the inside of the automobile compartment such that the automobile is reliably sealed.

Figure 11:
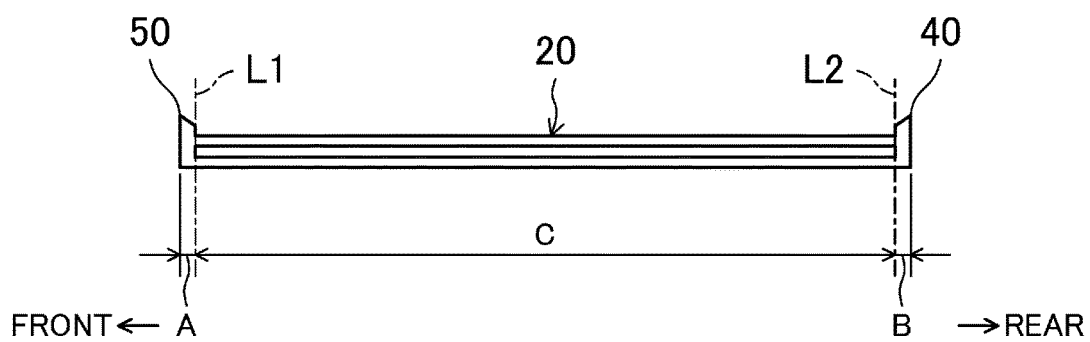
FIG. 11 is a side view of a left side belt line sealing member.

As illustrated in FIG. 11, the belt line sealing member 20 includes a front portion and a rear portion referred to as molded portions A and B, respectively, made with a mold (not shown) which can open and close. A portion between the molded portions A and B is referred to as an extruded portion C made by extrusion molding and having a substantially uniform cross section in the longitudinal direction between the front end and the rear end thereof. In other words, as illustrated in the same figure, the portion between a front border line L1 and a rear border line L2 is the extruded portion C, the portion in front of the front border line L1 is the front molded portion A, and the portion behind the rear border line L2 is the rear molded portion B. As illustrated in FIGS. 9 and 10, the extruded portion C includes a core member 29 made of a rigid material harder than the elastic material (e.g., TPE such as TPS and TPO, or rubber such as EPDM, each having a JIS A hardness of 60-80 degrees) used for the upper seal lip 22b and the lower seal lip 22c. The core member 29 has, for example, a U-shaped cross section, and is embedded in the inside wall 21, the upper wall 23, and the outside wall 22 of the belt line sealing member 20. The core member 29 may be made of hard material such as aluminum alloy, steel, stainless steel, or hard resin (e.g., resin mixed with talc or glass fiber). The core member 29 is continuous in the longitudinal direction without segmentation, and has a strength keeping it from changing dimensions when pulled by the operator during installation, i.e., the core member 29 is not extendable in the longitudinal direction. In contrast, the front molded portion A and the rear molded portion B are made of an elastic material.

As illustrated in FIG. 11, the rear molded portion B includes an upper portion provided with a rear seal lip shaped portion 40, which is in contact with an outer surface of the rear glass run 30 and protrudes upward. The rear seal lip shaped portion 40 is formed in a substantial U-shape opening rearward in top view and allowing the rear glass run 30 to be inserted into the U-shape. The rear seal lip shaped portion 40 is inclined upward toward the rear side. When the belt line sealing member 20 is in a normal installation state, the rear seal lip shaped portion 40 is in contact with and elastically deformed by the outer surface of the rear glass run 30 so as to be in close contact with this outer surface.

The front molded portion A includes an upper portion provided with a front seal lip shaped portion 50, which is in contact with an outer surface of the front glass run 10 and protrudes upward. The front seal lip shaped portion 50 also protrudes frontward. The front seal lip shaped portion 50 has a substantial U-shape opening frontward in top view and allowing the front glass run 10 to be inserted into the U-shape. The front seal lip shaped portion 50 is also inclined upward toward the front side. When the belt line sealing member 20 is in a normal installation state, the front seal lip shaped portion 50 is in contact with and elastically deformed by the outer surface of the front glass run 10 so as to be in close contact with that outer surface.

Figure 12:
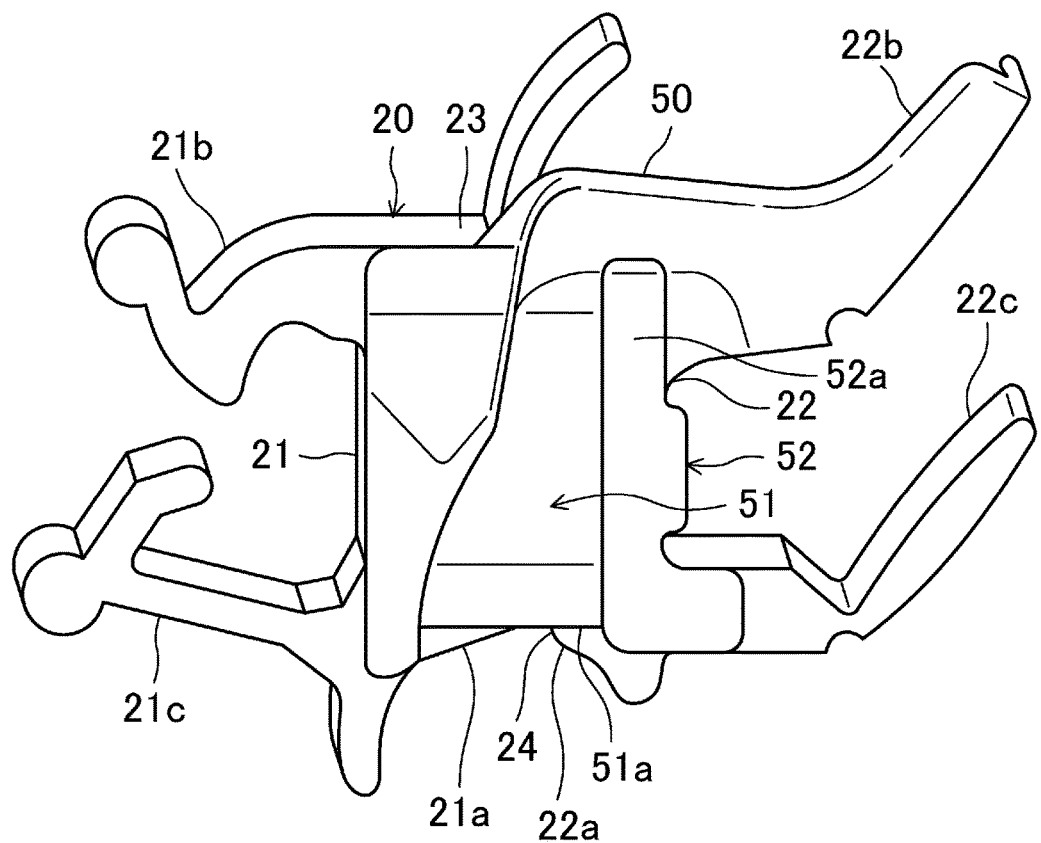
FIG. 12 is a front view of the left side belt line sealing member.
Figure 13:
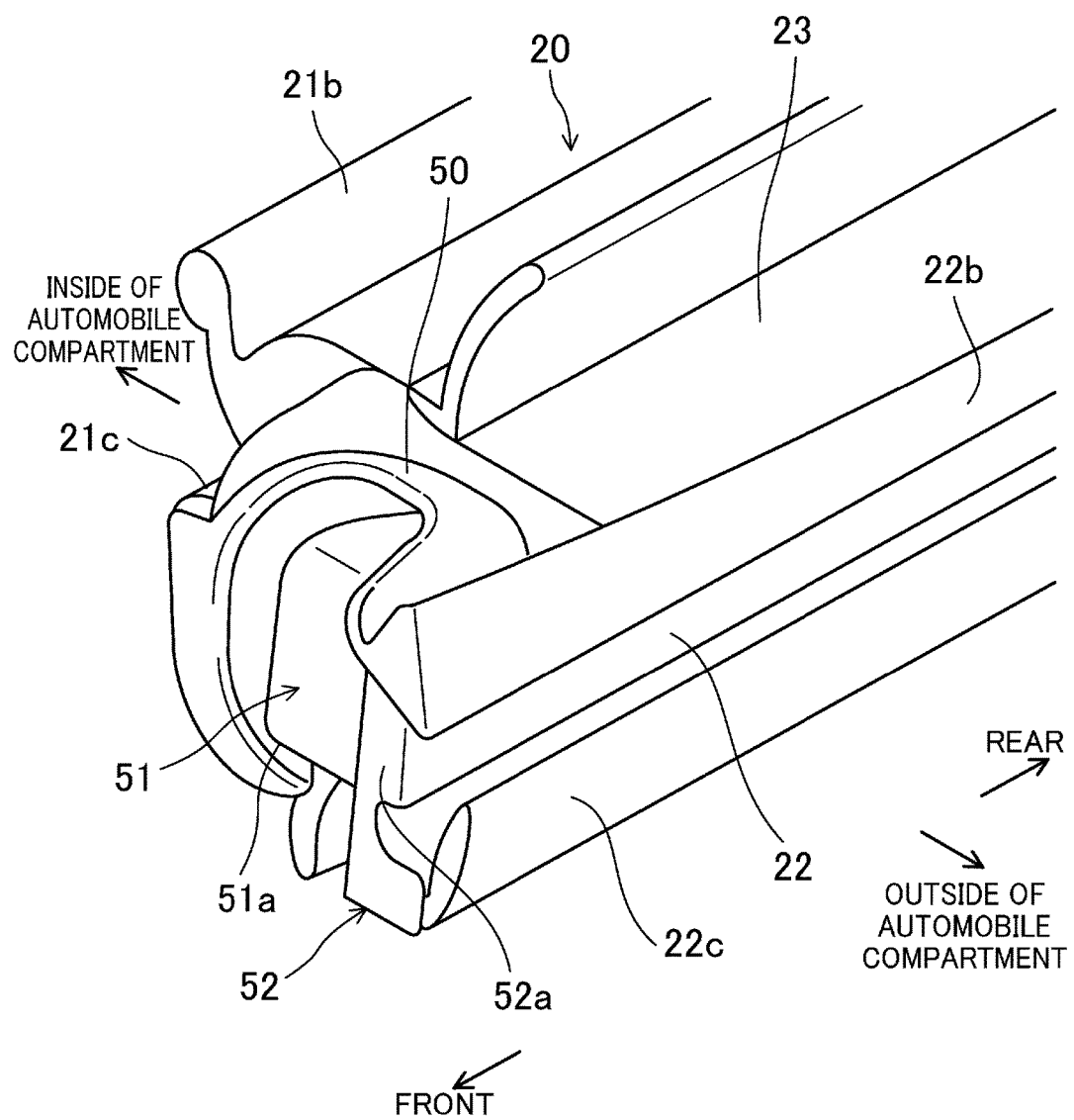
FIG. 13 is an enlarged perspective view of the front portion of the left side belt line sealing member viewed from outside the automobile compartment and from above the left side belt line sealing member.

As illustrated in FIGS. 12 and 13, the belt line sealing member 20 includes an end portion near the front glass run 10. This end portion, i.e., the front molded portion A, is provided with a stopper portion 51, which prevents the rear side rim portion 111a and the front rim portion 111b of the front notch 111 on the inner peripheral flange 109 from entering the panel insertion groove 24.

The stopper portion 51 bridges the front portion of the inside wall 21 and the front portion of the outside wall 22 of the belt line sealing member 20. The inside wall 21 and the outside wall 22 are coupled by the stopper portion 51. The stopper portion 51 also reaches the upper portion of the belt line sealing member 20, and is integrated with the upper wall 23. Accordingly, the front portion of the panel insertion groove 24 is blocked by the stopper portion 51. Note that, the stopper portion 51 may as well not be integrated with the upper wall 23. In this case, the stopper portion 51 bridges the gap between around the lower end portion of the inside wall 21 and around the lower end portion of the outside wall 22.

The stopper portion 51 includes a lower end surface 51a inclined upward toward the outer side of the longitudinal direction of the belt line sealing member 20 (inclined upward toward the front side in this embodiment). The lower end surface 51a of the stopper portion 51 is inclined upward in the same direction as the front rim portion 111b of the front notch 111 of the inner peripheral flange 109. The angle of the lower end surface 51a of the stopper portion 51 may be different from or may be the same as that of the front rim portion 111b of the front notch 111. The lower end surface 51a of the stopper portion 51 may also be a horizontal surface.

The front molded portion A includes a surface facing the outside of the automobile compartment. This surface is provided with a block portion 52. The block portion 52 is provided horizontally along the front end portion of the outside wall 22. When viewed from the front of the belt line sealing member 20, at least a part of the block portion 52 overlaps with the front end portion of the outside wall 22. Accordingly, when pressure is applied to the block portion 52 from front to rear, the block portion 52 is supported by the outside wall 22. This reduces deformation and displacement of the block portion 52.

The block portion 52 protrudes further toward the front side than the stopper portion 51. The block portion 52 is longitudinally thicker than the stopper portion 51. The block portion 52 includes a front surface, which extends vertically. This front surface is referred to as an abutting surface 52a and abuts the outer surface of the front glass run 10. The abutting surface 52a in the transverse direction of the automobile is longer than the outside wall 22 is thick (the dimension of the outside wall 22 in the transverse direction of the automobile). This allows the abutting surface 52a to securely abut the front glass run 10 allowing some installation tolerance. The thick block portion 52 also enhances rigidity near the front portion of the belt line sealing member 20. Thus, as described later, when the block portion 52 is abutted against the front glass run 10, it hardly deforms, and can be precisely positioned.

During the installation of the belt line sealing member 20, the abutting surface 52a of the block portion 52 is abutted against the rear side of the outer surface of the front glass run 10 so that the belt line sealing member 20 is correctly positioned longitudinally. Specifically, the longitudinal position of the abutting surface 52a of the block portion 52 (the extent of protrusion of the block portion 52 toward the front side) is determined such that the belt line sealing member 20 is in the normal installation position in a state where the abutting surface 52a abuts the outer surface of the front glass run 10. In this embodiment, the front seal lip shaped portion 50 is elastically linked to the outer surface of the front glass run 10, and the rear seal lip shaped portion 40 is elastically linked to the outer surface of the rear glass run 30. That is, the abutting surface 52a of the block portion 52 abuts the front glass run 10 such that the belt line sealing member 20 is longitudinally located in the normal installation position. In short, the abutting surface 52a of the block portion 52 serves as an abutting portion for assigning an installation position.

In this embodiment, the block portion 52 abuts the front glass run 10 such that the belt line sealing member 20 is located in the installation position. Alternatively, for example, the block portion and the abutting surface may be provided on a rear end portion of the belt line sealing member 20 so that the abutting surface abuts the front side of the rear glass run 30 (not shown). This allows the belt line sealing member 20 to be located in the normal installation position.

(Installation Procedure of Glass Run and Belt Line Sealing Member)

In the following, the installation procedure of the front glass run 10, the rear glass run 30, and the belt line sealing member 20 to the right side rear door 102 will be described. First, the front glass run 10 and the rear glass run 30 are mounted to the right side rear door 102. More specifically, as illustrated in FIG. 8, the outside wall 11, the inside wall 12, and the coupling wall 13 of the front glass run 10 are pushed into the front vertical frame bar 104a of the window frame 104, and the inner peripheral flange 109 is covered with the covering plate 14. Then, as illustrated in FIG. 5, the inside part 10a of the front glass run 10 is located inside the automobile compartment with respect to the inner peripheral flange 109, and the outside portion 10b of the front glass run 10 is located outside the automobile compartment with respect to the inner peripheral flange 109. Basically, the rear glass run 30 can be installed in the same manner as the front glass run 10.

Figure 14:
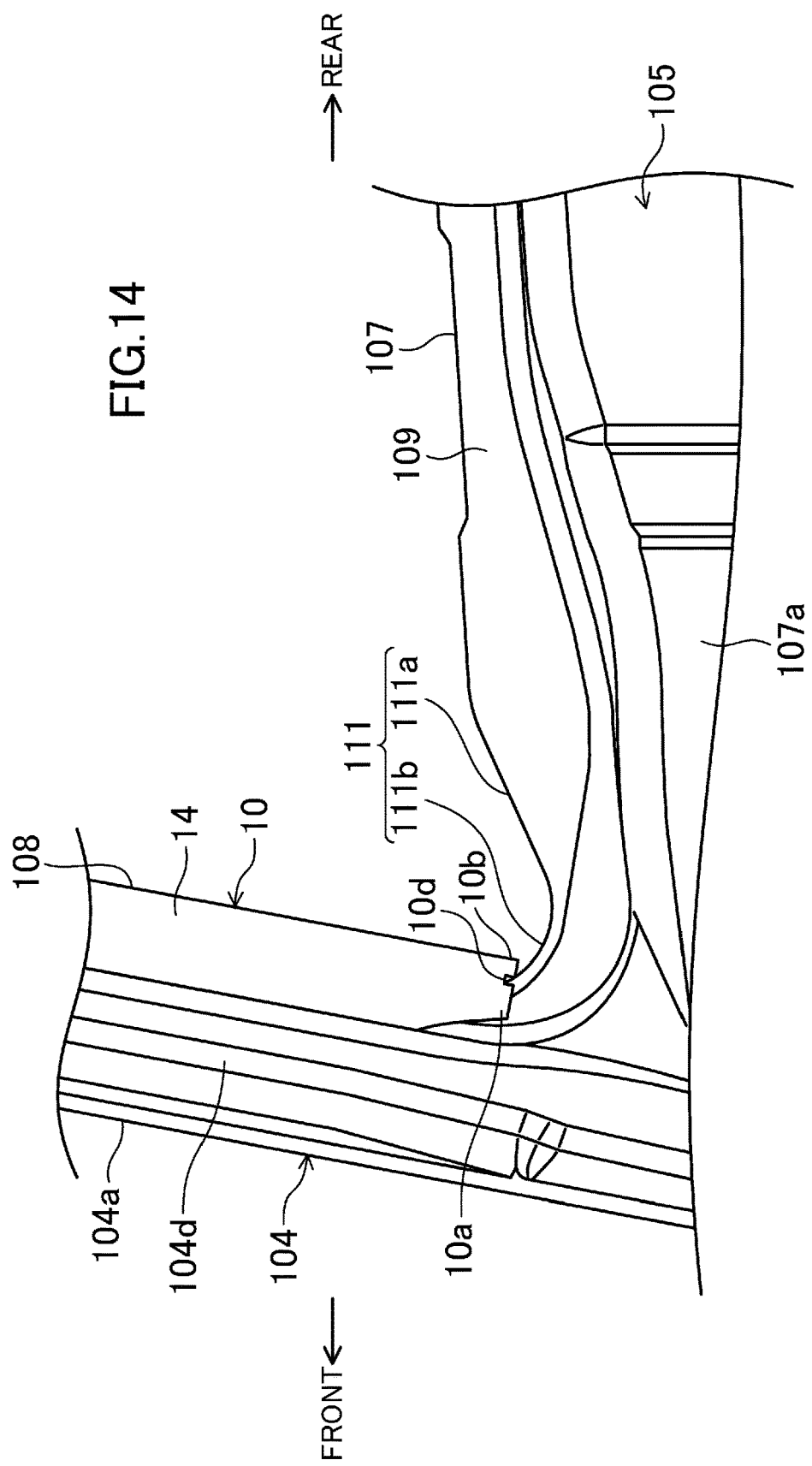
FIG. 14 illustrates a modified example of FIG. 5.

After the installation of the front glass run 10 and the rear glass run 30 to the right side rear door 102, the belt line sealing member 20 is installed. In this stage, the belt line 107 on the inner peripheral flange 109 is inserted into the panel insertion groove 24 of the belt line sealing member 20. However, as described above, the belt line sealing member 20 is slightly longer than the gap between the front glass run 10 and the rear glass run 30. Therefore, the belt line sealing member 20 is installed at an angle steeper than that after the installation. For example, if the belt line sealing member 20 includes a front end portion below the rear end portion, the front notch 111 is formed in the front portion of the belt line 107 on the inner peripheral flange 109. Thus, this front end portion is more likely to be displaced downward than at a locations where no front notch 111 is formed. In this embodiment, the front end portion of the belt line sealing member 20 is provided with the stopper portion 51, which reduces the risk of the rear side rim portion 111a and the front rim portion 111b of the front notch 111 on the inner peripheral flange 109 entering the panel insertion groove 24. This prevents the front end portion of the belt line sealing member 20 from being displaced more downward than necessary. Specifically, the level of the front seal lip shaped portion 50 of the belt line sealing member 20 during the installation process is determined by adding the distance between the lower end portion of the stopper portion 51 and the upper end portion of the upper wall 23 to the level of the upper end portion of the front notch 111. Thus, the front seal lip shaped portion 50 is located higher than the lower end of the slit 10d. Consequently, the front seal lip shaped portion 50 of the belt line sealing member 20 does not enter the slit 10d, which is the gap between the inside part 10a and the outside portion 10b which form the split portion of the front glass run 10. This results in improved installation workability. Improved installation workability of the belt line sealing member 20 can be obtained even if, as shown in a modified example in FIG. 14, the front glass run 10 is provided with a small slit 10d or without the slit 10d such that the lower end portion of the inside part 10a is located around the upper end portion of the front notch 111.

In addition, the abutting surface 52a of the block portion 52 of the belt line sealing member 20 is abutted against the back of the outer surface of the front glass run 10. Accordingly, the belt line sealing member 20 is correctly positioned longitudinally.

Moreover, during the installation of the belt line sealing member 20, the lower end surface 51a of the stopper portion 51 is inclined in the same direction as the rear side rim portion 111a of the front notch 111. Thus, by moving the lower end surface 51a of the stopper portion 51 along and substantially parallel with the rear side rim portion 111a of the front notch 111, the belt line sealing member 20 can be easily installed.

Then, the rear side of the belt line sealing member 20 is moved downward and the inner peripheral flange 109 is inserted into the panel insertion groove 24 of the belt line sealing member 20, in order to position the belt line sealing member 20 in the normal installation state.

As described above, in this embodiment, the front end portion of the belt line sealing member 20 is provided with the stopper portion 51, which prevents the risk of the rim portions 111a and 111b of the front notch 111 provided in the corner of the inner peripheral flange 109 entering the belt line sealing member 20. This reduces the risk of installation failures of the belt line sealing member 20, and results in an improved installation workability.

The inside wall 21 and the outside wall 22 of the belt line sealing member 20 can be coupled together by the stopper portion 51. This reduces the risk of deformation of the inside wall 21, the outside wall 22, and the stopper portion 51 as a whole. Moreover, the stopper portion 51 is integrated with the upper wall 23 of the belt line sealing member 20. This also reduces the risk of deformation of the stopper portion 51. That is, the stopper portion 51 provides further advantages.

As another embodiment, the block portion 52 of the belt line sealing member 20 can be omitted (not shown in the figures).

The above-described embodiment is merely illustrative in any aspects, and should not be construed restrictively. Any modifications and changes falling within the scope of equivalence of the appended claims are intended to be within the scope of the present disclosure.

As described above, the sealing structure for the automobile door according to the present disclosure is applicable, e.g., when separately installing a glass run and a belt line sealing member to a door provided on a side portion of an automobile.

What is claimed is:
1. A sealing structure for an automobile door of an automobile,
the automobile door being a door panel comprised of a press-formed article and including a window frame supporting a window glass,
the window frame having an inner peripheral side on which an inner peripheral flange is located,
the inner peripheral flange including a lower rim portion which forms a belt line extending in a longitudinal direction of the automobile, and a vertical rim portion continuous with the lower rim portion and extending upward,
the belt line having a corner close to the vertical rim portion, the corner being provided with a notch, and
a rim portion of the notch including an inclined rim portion which inclines downward toward the vertical rim portion, and an arc-shaped rim portion which is continuous with an end portion of the inclined rim portion closer to the vertical rim portion and extends so as to form an arc shape,
the sealing structure comprising:
a glass run vertically extending on the vertical rim portion of the inner peripheral flange, and
a belt line sealing member provided on the belt line of the inner peripheral flange and extending in the longitudinal direction of the automobile,
wherein
the belt line sealing member includes a longitudinal end portion,
the longitudinal end portion is in contact with the glass run,
the glass run includes a covering plate covering the inner peripheral flange, the covering plate includes a region corresponding to the belt line, the region includes a lower end portion located at least near the inclined rim portion or the arc-shaped rim portion of the notch of the inner peripheral flange, the belt line sealing member is provided with a panel insertion groove into which the belt line of the inner peripheral flange is inserted, the panel insertion groove opens downward, and the longitudinal end portion is provided with a stopper portion, which reduces the possibility of the inclined rim portion or the arc-shaped portion of the notch of the inner peripheral flange from entering the panel insertion groove.

2. The sealing structure of the automobile door of claim 1, wherein the belt line sealing member includes an inside wall and an outside wall, each provided vertically, the inside wall and the outside wall sandwich the belt line of the inner peripheral flange in a transverse direction of the automobile, and the stopper portion bridges the inside wall and the outside wall of the belt line sealing member, and the inside wall and the outside wall are coupled by the stopper portion.

3. The sealing structure of the automobile door of claim 2, wherein the belt line sealing member includes an upper wall continuous with an upper portion of the inside wall and an upper portion of the outside wall, and the stopper portion is integrated with the upper wall.

4. The sealing structure of the automobile door of claim 1, wherein the stopper portion includes a lower end surface inclined in a same direction as the inclined rim portion of the notch.

5. The sealing structure of the automobile door of claim 1, wherein the belt line sealing member includes a seal portion made of an elastic material and in contact with the window glass, and a core member made of a rigid material harder than the elastic material used for the seal portion, and the core member is not longitudinally extendable.

* * * * *